(No Model.)

H. E. COY.
PROCESS OF CUTTING BOLT THREADING DIES.

No. 250,134. Patented Nov. 29, 1881.

WITNESSES
Ott. Engel
Jno. Crowell Jr.

Henry E. Coy    INVENTOR
By Liggett & Liggett
ATTORNEYS

UNITED STATES PATENT OFFICE.

HENRY E. COY, OF CLEVELAND, OHIO, ASSIGNOR TO HIMSELF, AND A. M. BARNES, E. W. GAYLORD, AND HOTCHKISS & GAYLORD, ALL OF SAME PLACE.

PROCESS OF CUTTING BOLT-THREADING DIES.

SPECIFICATION forming part of Letters Patent No. 250,134, dated November 29, 1881.

Application filed January 25, 1881. (No model.)

*To all whom it may concern:*

Be it known that I, HENRY E. COY, of Cleveland, in the county of Cuyahoga and State of Ohio, have invented certain new and useful Improvements in a Process of Cutting Bolt-Threading Dies; and I do hereby declare the following to be a full, clear, and exact description of the invention, such as will enable others skilled in the art to which it pertains to make and use it, reference being had to the accompanying drawings, which form part of this specification.

My invention relates to a process of and apparatus for cutting dies, such as are used in bolt-threading machines; and it consists in cutting and recutting the same with a tap having two or more threads, and being at least twice the diameter of the bolt or rod intended to be cut by the said dies.

Figure 1:
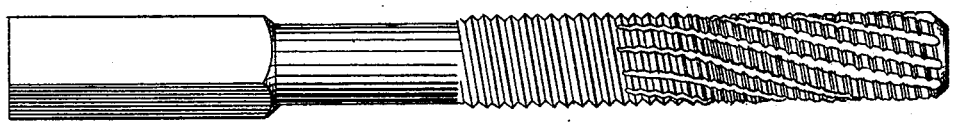
Figure 2:
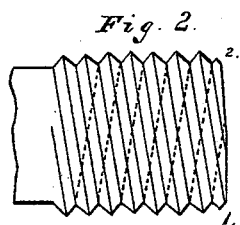
Figure 3:
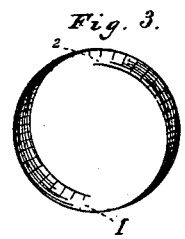
Figure 4:
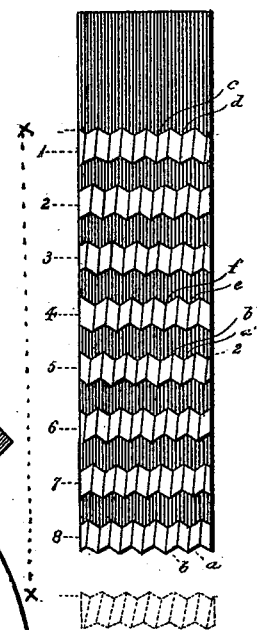
Figure 5:
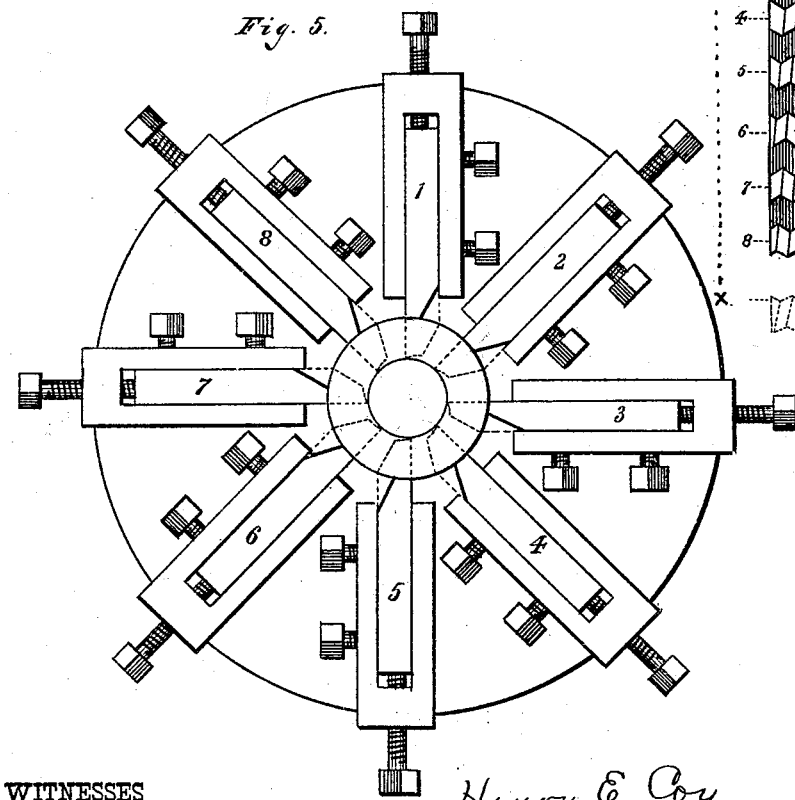

In the drawings, Figure 1 is a side elevation of my tap for cutting the dies. Fig. 2 is an enlarged view of the same, showing the pitch and arrangement of the thread. Fig. 3 is an end view of Fig. 2. Fig. 4 is a developed view, partly in solid and partly in dotted lines, of the dies, showing the relative arrangement of teeth as cut by the tap, Fig. 2, when said dies are secured in the chuck, as shown in Fig. 5. Fig. 5 is a plan view of a chuck for holding the dies in place while being cut by the tap.

Heretofore it has been the custom to form or cut the teeth or thread-segments on the end of the dies with a tap of the same, or practically the same, diameter as the bolt or rod intended to be threaded by said dies. This manner of cutting the dies has been found objectionable, for the reason that the cutting ends of the dies have not clearance enough, the heels and cutting-edge being in contact with the bolt while it (the bolt) is being threaded, and hence creating much friction and consequent heating of both dies and bolt.

As will be hereinafter described, my invention does away with this objection, and at the same time enables the workman to cut or recut at least two sets of dies at one and the same operation.

In my process of cutting and recutting the dies I employ a tap of at least twice the diameter of the bolt intended to be threaded by said dies, and having at least two threads, or, in other words, being a double-threaded tap.

When I employ a tap of twice the diameter of the bolt intended to be threaded by the dies I will have to use a double-threaded tap, each thread having twice the pitch of the thread intended to be cut on said bolt.

My reason for employing a double-threaded tap will be apparent. If I employed one thread of any given inclination on my tap, the distance between the threads would be twice as great on the tap as on the bolt, it having to travel twice the distance around; and it will be seen by reference to Fig. 4 (X X being the distance around the tap) that dies cut with a single-threaded tap could not be employed to cut a bolt of less diameter than the tap, as the teeth of one die would not then follow in the track of the preceding one. However, by using a double-threaded tap I obviate this difficulty in the following manner: Having secured my dies in the die-chuck, Fig. 5, I proceed to cut them with the tap. We will assume that thread No. 1 on tap starts to cut die No. 1. At the same time thread No. 2 will start to cut die No. 5, and when thread No. 1 reaches die No. 5 thread No. 2 will start to cut the second tooth or thread-segment $d$ on die No. 1, and thread No. 1 will cut the second tooth or thread-segment $a'$ on die No. 5, and after it (thread No. 1) has cut the tooth or segment $b$, die No. 8, it starts to cut the tooth or segment $c$, die No. 1, also shown in dotted lines, Fig. 4, and thread No. 2 starts to cut the tooth or segment $b'$, die No. 5, and so on, each thread of the tap cutting every second tooth or segment on the dies, these teeth or segments having the same incline as the threads of the tap, and being the same distance apart. (See Figs. 2 and 4.) Now we will assume that the tap employed to cut the dies is three-fourths of an inch in diameter, and the bolt to be threaded by said dies is three-eighths of an inch in diameter, or one-half of the diameter of the tap. If, after being tempered, the dies 1, 2, 3, 4, 5, 6, 7, and 8 were replaced in the chuck in exactly the same position as they were while being cut by the tap, a bolt or rod three-fourths of an inch in diameter, or the same diameter as the tap, could be threaded by the dies, the thread on said bolt or rod being in every respect the counterpart of the thread on the tap—viz., a double thread—and the same number of threads to the inch, as the dies would have to travel the same distance around that they did while being cut by the tap. Now, to cut a bolt or rod three-eighths of an inch in diameter, or one-half the diameter of the tap, the dies will have to travel only one-half the distance around that they did while being cut, and only four consecutive dies could be used, it making no difference which consecutive four, as, by reference to the drawings, Fig. 4, it will be seen that any consecutive four will cut a perfect single thread having the same incline and the same number to the inch as the tap. We will take, for instance, dies 1, 2, 3, and 4. It will be seen, Fig. 4, that, starting with die No. 1, the first tooth to the right will start to cut the bolt, and will travel forward until it comes to $e$, die No. 4. Now it will be seen that the tooth $d$, which was cut by thread No. 2 of the tap, and which is in exactly the same position or place on die No. 1 that the tooth $a'$ is on die No. 5, will follow in the track that tooth $e$ did, and so on, tooth $c$ following in the track of tooth $f$, the cutting end of dies Nos. 1 and 5 being one the counterpart of the other. Thus a perfect single thread is formed on a bolt of one-half the diameter of the tap.

My reason for using a tap of greater diameter than the bolt is that I get a better clearance on my dies, and consequently a better cutting-edge, as shown by dotted lines, Fig. 5. My dies will last much longer when cut in this manner, as they do not cause so much friction and heat, hence wearing less and retaining their temper until they are worn out. The bolts are also far better cut, as the dies cut a clean, smooth thread, and not the rough jagged thread seen so much on bolts cut with dies as they are now made.

I prefer to use the tap shown in Fig. 1 with a double thread, and having the longitudinal flutes made spiral, and also being fluted only part of its length, thus leaving a portion of the tap to finish or smooth the die-segments; but it will be apparent that I may use a tap having three threads, the only difference being I would cut three sets of dies, &c.

What I claim is—

The process of cutting dies substantially as hereinbefore set forth, consisting, essentially, in cutting and recutting the same with a tap the diameter of which is a multiple of the diameter of the bolt to be cut, such multiple being the number of threads on the forming-tap.

In testimony whereof I have signed my name to this specification in the presence of two subscribing witnesses.

HENRY E. COY.

Witnesses:
W. E. DONNELLY,
ALBERT E. LYNCH.